United States Patent [19]

Murakami

[11] Patent Number: 4,519,360
[45] Date of Patent: May 28, 1985

[54] ACCELERATOR PEDAL CONTROL SYSTEM FOR AUTOMOTIVE VEHICLE

[75] Inventor: Terukiyo Murakami, Yokosuka, Japan

[73] Assignee: Nissan Motor Company, Limited, Yokohama, Japan

[21] Appl. No.: 598,204

[22] Filed: Apr. 9, 1984

[51] Int. Cl.³ .............................................. F02D 9/00
[52] U.S. Cl. .................... 123/399; 123/361; 123/403
[58] Field of Search ................ 123/361, 395, 399, 403

[56] References Cited

U.S. PATENT DOCUMENTS

| | | | |
|---|---|---|---|
| 4,301,883 | 11/1981 | Collonia | 123/361 |
| 4,377,995 | 3/1983 | Fiala | 123/361 |
| 4,380,799 | 4/1983 | Allard et al. | 123/361 |
| 4,419,973 | 12/1983 | Collonia | 123/361 |
| 4,470,396 | 9/1984 | Hasumi et al. | 123/399 |

FOREIGN PATENT DOCUMENTS 51-138235  11/1976  Japan.
57-44750  3/1982  Japan.

Primary Examiner—William A. Cuchlinski, Jr.
Attorney, Agent, or Firm—Schwartz, Jeffery, Schwaab, Mack, Blumenthal & Evans

[57] ABSTRACT

In an accelerator control system including electrical elements or devices, if trouble occurs in these elements, the throttle valve may be kept open in spite of the fact that the accelerator pedal is fully released. To overcome the above problem, an accelerator pedal zero-stroke detector, a throttle valve initial-position detector and an abnormality signal generator are additionally provided for the accelerator control system, in order to generate an alarm signal or a system disabling signal when the throttle valve is kept open beyond a predetermined time interval after the accelerator pedal has been fully released.

3 Claims, 6 Drawing Figures

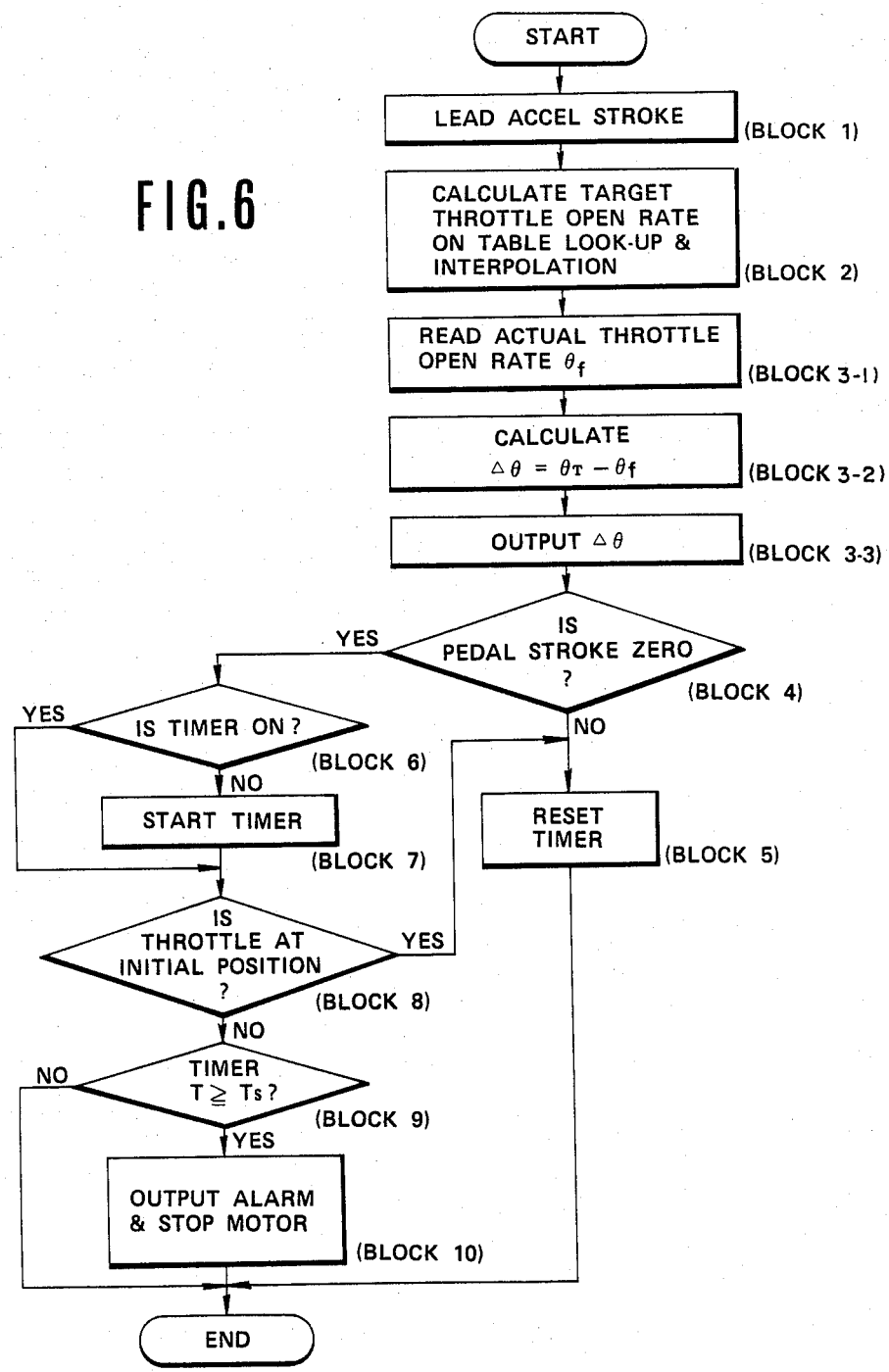

ACCELERATOR PEDAL CONTROL SYSTEM FOR AUTOMOTIVE VEHICLE

BACKGROUND OF THE INVENTION

1. Field of the Invention

The present invention relates generally to an accelerator pedal control system for an automotive vehicle by which a throttle valve opening rate is controlled via electrical or pneumatic devices in response to accelerator pedal stroke, and more specifically to a control system which outputs an alarm or a disabling signal in case where the control system is abnormal.

2. Description of the Prior Art

In an automotive vehicle, when an accelerator pedal is depressed by the driver, a throttle valve disposed in a carburetor is opened to accelerate the vehicle. Conventionally, the relationship between the stroke of the accelerator pedal depressed by the driver and the opening rate of the throttle valve is fixedly predetermined in dependence upon the mechanical structure of the throttle device.

For instance, in the case of a single barrel throttle device, because the throttle valve opening rate is predetermined to be roughly linear in proportion to the accelerator pedal stroke, throttle valve opening rate increases relatively abruptly with increasing accelerator pedal stroke.

These accelerator pedal control characteristics are suitable for accelerating the vehicle quickly, for instance, to avert danger when the vehicle is travelling at a high speed on a highway. However, these are not suitable for repeatedly and finely driving the vehicle a little forward slowly when the vehicle is travelling at a low speed on a busy street. In contrast with this, in the case of a twin barrel throttle device, because the throttle valve opening rate is predetermined to be delayed according to the accelerator pedal stroke, throttle valve opening rate increases relatively gently with increasing accelerator pedal stroke. Therefore, the accelerator pedal control characteristics are suitable for repeatedly and finely driving the vehicle a little forward slowly when the vehicle is travelling at a low speed on a busy street. However, these are not suitable for accelerating the vehicle quickly to avert danger when the vehicle is travelling at a high speed on a highway.

That is to say, in the conventional accelerator device, it is impossible to freely obtain appropriate accelerator pedal control characteristics indicative of relationship between throttle valve opening rate and accelerator pedal stroke according to driver's preference or vehicle travelling conditions.

In order to overcome the above-mentioned problems, the same inverter has proposed a novel accelerator pedal control system for an automotive vehicle such that any appropriate accelerator pedal control characteristics representative of relationship between throttle valve opening rate and accelerator pedal stroke can be selected freely by driver's preference according to vehicle travelling conditions (U.S. patent application Ser. No. 564,682). In such a control system as described above, however, since there are arranged a number of electrical or pneumatic devices such as potentiometers encoders, motors, switches, sensors, etc. between the accelerator pedal and the throttle value, there exists a problem in that the throttle value is kept opened, in spite of the fact that the accelerator pedal is fully released, because these devices operate abnormally due to potentiometer looseness or aging, element failure, etc.

SUMMARY OF THE INVENTION

With these problems in mind, therefore, it is the primary object of the present invention to provide an accelerator pedal control system for an automotive vehicle which outputs an alarm signal or a system-disabling signal or a command signal to compulsorily close a throttle value in case the throttle valve is kept open in spite of the fact that an accelerator pedal is fully released.

To achieve the above-mentioned object, the accelerator pedal control system for an automotive vehicle according to the present invention comprises an accelerator pedal, a throttle valve, means for detecting a stroke of said accelerator pedal and outputting an accelerator pedal stroke signal, means for calculating a target throttle valve opening rate on the basis of the detected accelerator pedal stroke signal and generating a target throttle valve opening rate control command signal, means for driving said throttle valve in response to the target throttle valve opening rate control command signal, means for detecting that said accelerator pedal is at its zero-stroke position and outputting an accelerator pedal zero-stroke signal, means for detecting that said throttle valve is at its initial position and outputting a throttle valve initial-position signal, and means for generating an abnormality command signal when the throttle-valve initial-position signal is not outputted within a predetermined time interval after the accelerator pedal zero-stroke signal has been outputted.

BRIEF DESCRIPTION OF THE DRAWINGS

The features and advantages of the accelerator pedal control system for an automotive vehicle according to the present invention will be more clearly appreciated from the following description taken in conjunction with the accompanying drawings in which like reference numeral designate corresponding elements and in which:

FIG. 6 is another similar program control flowchart showing the control step of the accelerator control system according to the present invention.

DETAILED DESCRIPTION OF THE PREFERRED EMBODIMENTS

Figure 1:
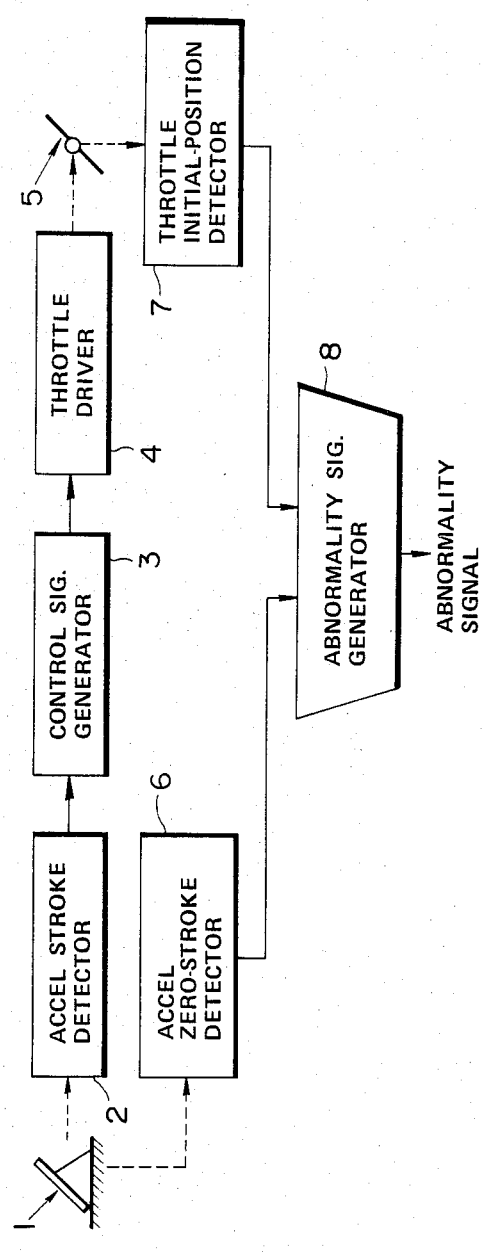
FIG. 1 is a schematic block diagram of a first embodiment of the accelerator pedal control system for an automotive vehicle according to the present invention.

In view of the above description, reference is now made to a first embodiment of the present invention. With reference to FIG. 1, the accelerator pedal control system of the present invention comprises an accelerator pedal 1, an accelerator pedal stroke detector 2, a control signal generator 3, a throttle valve driver 4, a throttle valve 5, an accelerator zero-stroke detector 6, a throttle intitial position detector 7, and an abnormality signal generator 8.

The accelerator pedal stroke detector 2 detects the stroke of the accelerator pedal 1. The control signal generator 3 reads a stroke signal outputted from the accelerator pedal stroke detector 2, determines a target throttle valve opening rate by looking-up a table in which control characteristics representative of relationship between throttle valve opening rate and accelerator pedal stroke are listed and by executing necessary interpolation calculation, and outputs a command signal to the throttle valve driver 4. The throttle valve driver 4 drives the throttle valve 5 in accordance with the command signal outputted from the control signal generator 3. The accelerator zero-stroke detector 6 detects that the accelerator pedal 1 is at its zero-stroke (fully-released) position and outputs an accel zero-stroke signal corresponding thereto. The throttle initial-position detector 7 detects that the throttle valve 5 is at its initial position and outputs a throttle initial-position (idling position) signal corresponding thereto. The abnormality signal generator 8 receives both the accel zero-stroke signal from the accelerator zero-stroke detector 6 and the throttle initial-position signal from the throttle initial position detector 7, respectively, and outputs an abnormality command signal when the throttle initial-position signal is not received within a predetermined time interval after the accel zero-stroke signal has been received. This abnormality command signal is usable for producing an alarm signal, a command signal to disable the entire system or another command signal to compulsorily return the throttle valve to its initial position.

Figure 2:
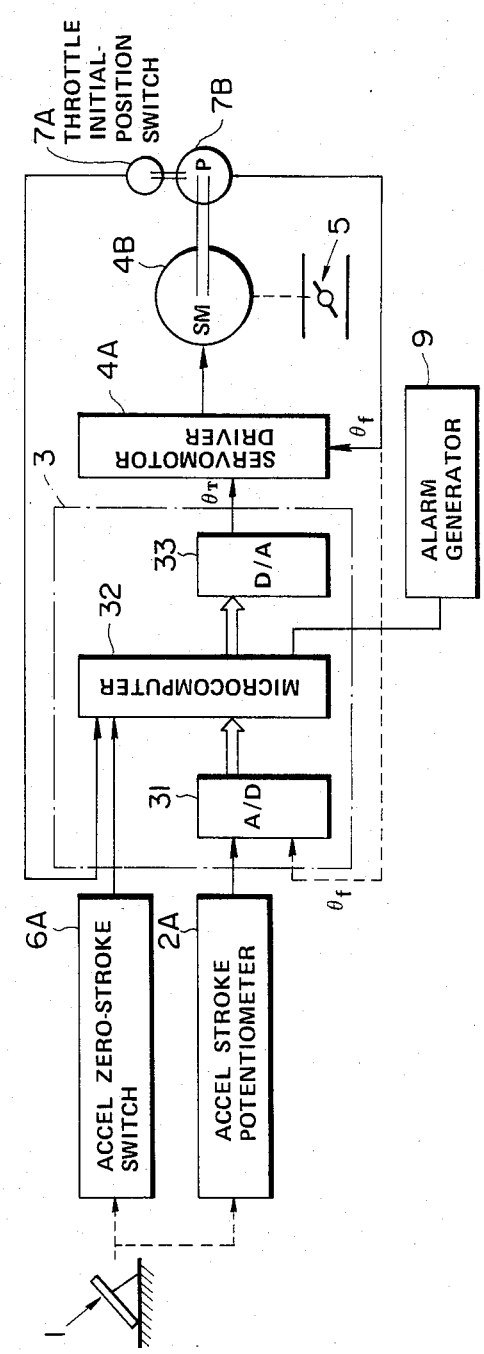
FIG. 2 is a schematic block diagram of a second embodiment of the accelerator pedal control system for an automotive vehicle according to the present invention.

FIG. 2 is a schematic block diagram of a second embodiment of the accelerator pedal control system according to the present invention. In FIG. 2, the system comprises an accelerator pedal zero-stroke switch 6A, an accelerator pedal stroke potentiometer 2A, a control signal generator 3 including an analog-to-digital converter 31, a microcomputer 32 and a digital-to-analog converter 33, a servomotor driver 4A, a servomotor 4B, a throttle initial-position switch 7A, a throttle opening rate potentiometer 7B, and an alarm generator 9.

The accelerator pedal zero-stroke switch 6A is turned on when the accelerator pedal is fully released, that is, when accelerator pedal stroke is zero. The accelerator pedal stroke potentiometer 2A outputs an analog signal the voltage level of which is proportional to the stroke of the accelerator pedal.

Figure 3:
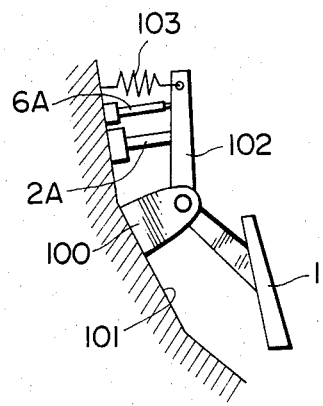
FIG. 3 is a pictorial illustration showing an exemplary structure for detecting accelerator pedal stroke used with the accelerator pedal control system according to the present invention.

FIG. 3 is a pictorial illustration showing an example of the structure of an accelerator pedal provided with the zero-stroke switch 6A and the stroke potentiometer 2A. A bracket 100 is fixed at an appropriate position to the floor 101 of a vehicle body. The middle portion of a shallow-V-shaped pedal lever 102 is pivotably supported by the bracket 100. The accelerator pedal 1 is fixed to one end of the pedal lever 102. A return spring 103 is disposed between the floor 101 and the other end of the pedal lever 102. The pedal 1 is urged by this return spring 103 to its zero-stroke position when released. The accelerator pedal zero-stroke switch 6A of limit switch type is disposed between the floor 101 and the pedal lever 102 at such a position as to be turned on when the pedal 1 is fully released. The accelerator pedal stroke potentiometer 2A is also disposed between the floor 101 and the pedal lever 102. This potentiometer 2A is of linear sliding-contact resistance type.

The control signal generator 3 receives the on-off signal from the accelerator zero-stroke switch 6A directly and the stroke signal from the accelerator stroke potentiometer 2A through the analog-to-digital converter 31. The control signal generator 3 determines a target throttle valve opening rate in accordance with table look-up method and interpolation, and outputs a target command signal through the digital-to-analog converter 33.

The servomotor driver 4A receives the target command signal $\theta_T$ from the control signal generator 3 and a feedback signal $\theta_f$ indicative of throttle valve opening rate from the throttle potentiometer 7B, and drives the servomotor 4B in the direction that the difference $(\theta_T - \theta_f)$ between the two signals is reduced to zero. The throttle initial-position switch 7A is turned on when the throttle valve 5 is positioned at a predetermined initial position (e.g. an idling position or fully-closed position).

Figure 4:
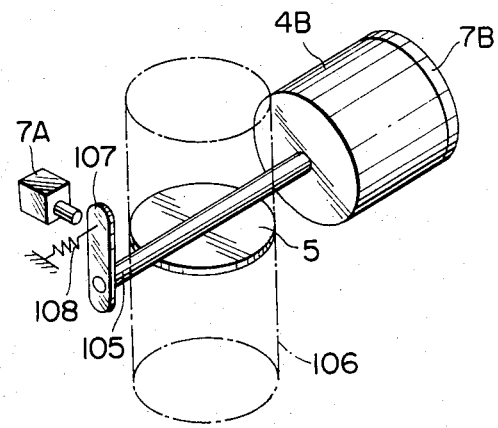
FIG. 4 is a pictorial illustration showing an exemplary structure for detecting throttle valve opening rate used with the accelerator pedal control system according to the present invention.

FIG. 4 is a pictorial illustration showing an example of the structure of a throttle valve provided with the throttle switch 7A and the throttle potentiometer 7B. The throttle valve 5 is fixed to a throttle shaft 105 pivotably supported at an appropriate position to an intake air conduit 106. The shaft 105 is directly connected to a driven shaft of the servomotor 4B. At the end of the throttle shaft 105, a lever 107 is fixed. A return spring 108 is disposed to urge the throttle valve 5 to its initial position. The throttle initial-position switch 7A of limit switch type is disposed at such a position as to be turned on when the throttle valve is returned to its initial position. The throttle potentiometer 7B is attached on the flat end of the servomotor 4B. This potentiometer 7B is of rotary sliding-contact resistance type. The potentiometer 7B includes a rotatable sliding contact coupled with the driven shaft 105 of the servomotor 4B and a circular resistance on which the sliding contact slides. Therefore, when the servomotor 4B rotates through an angle, since the sliding contact also slides on and along the circular resistance together with the throttle valve 5, the potentiometer 7B outputs an analog signal the voltage level of which is proportional to the angular stroke of the throttle valve 5.

Figure 5:
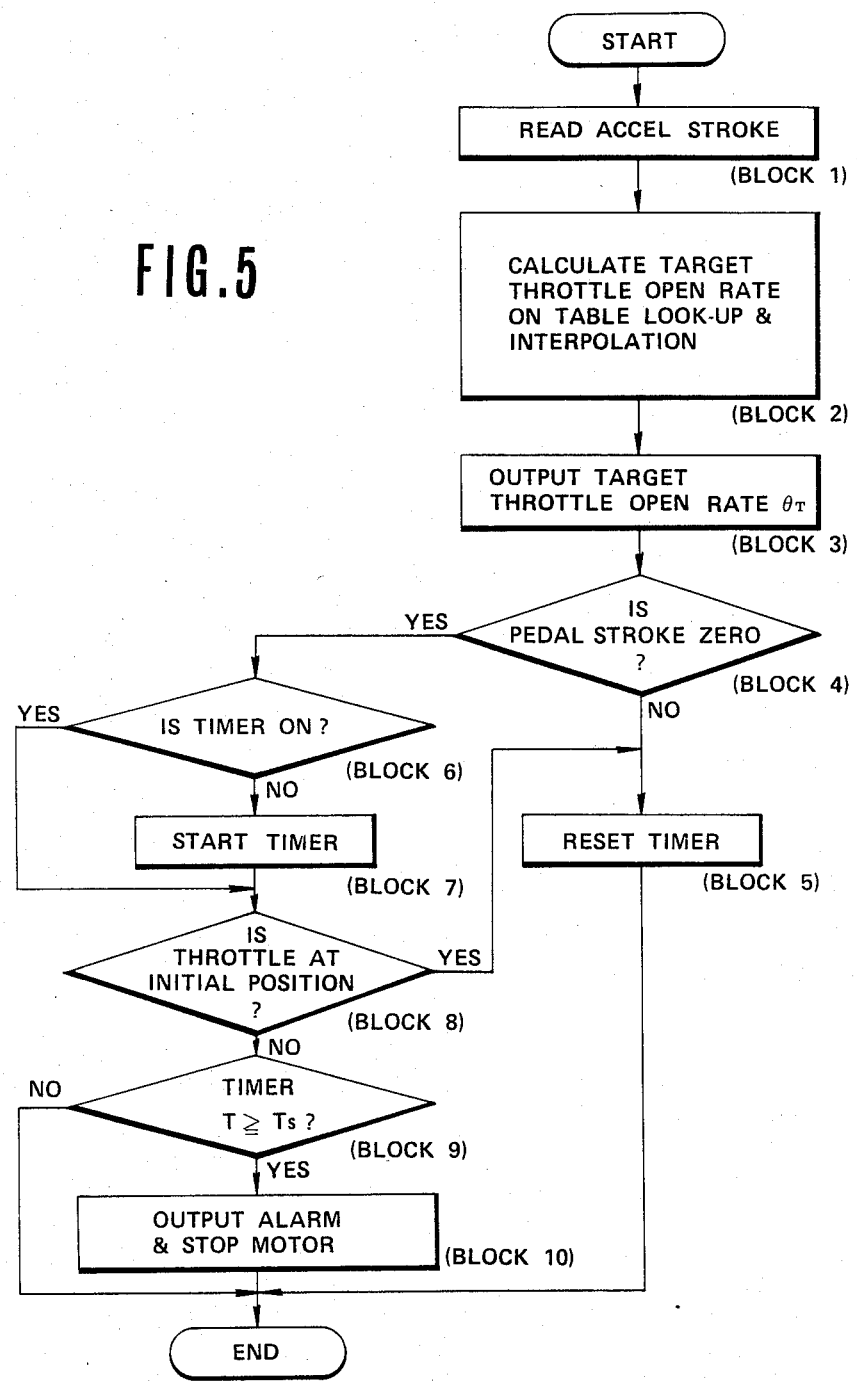
FIG. 5 is a program control flowchart showing the control steps of the accelerator pedal control system according to the present invention.

FIG. 5 is an example of a flowchart showing control program stroed in the microcomputer 32. With reference to FIG. 5, the operation of the second embodiment of the present invention will be described hereinbelow. First, control reads the accelerator pedal stroke data outputted from the accelerator pedal stroke potentiometer 2A via the analog-to-digital converter 31 (in block 1). In response to the read pedal stroke data, control looks up a previously-stored table in which control characteristics representative of relationship between throttle valve opening rate and accelerator pedal stroke are listed and performs a required interpolation calculation in order to obtain a target throttle valve opening rate corresponding to the read accelerator pedal stroke (in block 2). The calculated target throttle valve opening rate is then supplied to the servomotor driver 4A via the digital-to-analog converter 33 (in block 3). The servomotor driver 4A drives the servomotor 4B in accordance with the target throttle valve opening rate command signal and the feedback signal from the potentiometer 7B. Control then reads the output of the accelerator pedal zero-stroke switch 6A in order to check whether or not the accelerator pedal 1 is at its zero-stroke position (in block 4). Here, if the accelerator pedal is being depressed, since the pedal zero-stroke switch 6A is turned off without outputting an on-signal, control determines "NO" and advances to the succeeding step to reset a timer the function of which is previously provided within the microcomputer 32 (in block 5). As long as the accelerator pedal is being depressed, since the decision in block 4 is "NO", control repeats the blocks 1, 2, 3, 4, 5, 1 . . . within a predetermined period.

In contrast with this, when the driver releases his foot from the accelerator pedal, since the pedal zero-stroke switch 6A is turned on, control determines "YES" (in block 4) and advances to the succeeding step (of block 6). In block 6, control checks whether or not the timer is in operation. If the timer is in operation, this indicates that the accelerator pedal has already been released. If the timer is not in operation, this indicates that the accelerator pedal has just now been released. Therefore, when the accelerator pedal has just now been released, since the timer is not yet in operation, control determines "NO" (in block 6) and advances to the succeeding step to start the timer (in block 7). After the accelerator pedal has been released and returned to its zero-stroke position, the throttle value must also be returned to its initial position within a predetermined time interval. Therefore, control reads the output of the throttle switch 7A in order to check whether or not the throttle valve 5 is at its initial position (in block 8). In block 8, if the throttle valve is at its initial position, control advances to block 5 to reset the timer which has been started in block 7, repeating the blocks 5, 1, 2, 3, 4, 6, 7, 8, 5 . . . . In block 8, if the throttle valve is not at its initial position, control determines "NO" and advances to the succeeding step in order to check whether the timer operates beyond a predetermined time interval $T_s$ (in block 9). Here, provided that all the elements or devices such as pedal potentiometer 2A, control signal generator 3, servomotor driver 4A, throttle valve potentiometer 7B, etc. are normal, the throttle valve 5 is to return to its initial position (fully-closed or idling position) within the predetermined time interval $T_s$. Therefore, when control determines that the period of time T elapsing after the accelerator pedal has been returned to its zero-stroke position does not exceed the predetermined time interval $T_s$ and therefore "NO" (in block 9), control returns to the step of block 1, repeating the blocks 8, 9, 1, 2, 3, 4, 6, 8 . . . until the throttle valve is returned to its initial position. Thereafter, since the throttle valve is returned to its initial position within the predetermined time interval $T_s$, control determines "YES" in block 8, advancing to block 5 to reset the timer. Therefore, provided that the throttle valve is returned to its initial position normally, control repeats the blocks 5, 1, 2, 3, 4, 6, 7, 8, 5, . . . in order to execute the accelerator pedal control operation.

In contrast with this, when the throttle valve does not return to its initial position within the predetermined time interval $T_s$ because there exists a trouble in the control system, since the timer is kept in operation beyond the time interval $T_s$, control determines "YES" (in block 9) and advances to the succeeding step in order to output an alarm signal or stop the servomotor (in block 10). In dependence upon this alarm signal, it is possible to inform the driver that there exists an abnormality in the control system. As the alarm generator 9 shown in FIG. 2, a buzzer, a voice warning, an alarm light, an alarm display, etc. are used. Further, in response to this alarm signal, it is possible to cut-off the current supplied to the servomotor 4B, that is, to disable the servomotor 4B. In this case, the throttle valve 5 is forcedly returned to its initial position by the elastic force of the return spring 108 as depicted in FIG. 4. Therefore, it is securely prevent a trouble or danger such that the throttle valve 5 is kept open in spite of the fact that the accelerator pedal 1 is fully released.

Further, the above-mentioned predetermined time interval $T_s$ is set to about 0.1 sec. This results from U.S. MVSS standard, in which the maximum allowable time interval from when the throttle valve is fully opened to when the throttle valve is fully closed to its idling position is determined to be one second.

In the second embodiment shown in FIG. 2, the servomotor 4B is used for driving the throttle valve 5. However, it is also possible to use other motors such as step motor or other actuators of hydraulic or pneumatic type. In the case such motors or actuators are used with the accelerator pedal control system of the present invention, since these devices are not provided with feedback function as in the servomotor, the feedback signal outputted from the throttle opening rate potentiometer 7B should be feedbacked to the microcomputer 32 via the analog-to-digital converter 31, as depicted by dashed line in FIG. 2.

FIG. 6 is an example of a flowchart of control program used for the case where motors or actuators other than servoactuators are incorporated within the system. With reference to FIG. 6, the operation of the third embodiment of the present invention will be described hereinbelow. First, control reads the accelerator pedal stroke data outputted from the accelerator pedal stroke potentiometer 2A via the analog-to-digital converter 31 (in block 1). In response to the read pedal stroke data, control looks up a previously-stored table and performs a required interpolation calculation in order to obtain a target throttle valve opening rate $\theta_T$ corresponding to the read accelerator pedal stroke (in block 2). Then, control reads an actual or feedbacked throttle valve opening rate $\theta_f$ outputted from the throttle valve opening rate potentiometer 7B via the analog-to-digital converter 31 (in block 3-1) and calculates the difference ($\Delta\theta = \theta_T - \theta_f$) in throttle valve opening rate between the target value $\theta_T$ and the actual (feedback) value $\theta_f$ (in block 3-2). The calculated value $\Delta\theta$ is then outputted to the actuator as a driving command signal (in block 3-3). Thereafter, exactly the same steps as in the second embodiment shown in FIG. 5 are executed, accordingly the description thereof being omitted herein.

Further, in the above-mentioned embodiments, a resistance-type potentiometer is used as the accelerator pedal stroke potentiometer 2A or the throttle valve opening rate potentiometer 7B. However, it is of course possible to use a pulse encoder which can output encoded pulse signals representative of position, in place of the potentiometer. Furthermore, in the above-mentioned embodiments, a mechanical limit switch is used as the accelerator pedal zero-stroke switch 6A or the throttle valve initial-position switch 7A. However, it is of course possible to use other switches such as a slide switch having a movable contact and a fixed contact, a pressure sensitive switch, a magnetic sensitive switch, etc.

As described above, in the accelerator pedal control system for an automotive vehicle by which the throttle valve is controlled, by means of electrical, hydraulic or pneumatic driving system, according to the accelerator pedal stroke, in case where the throttle valve is kept open, in spite of the fact that the accelerator pedal is fully released, because of failure or trouble occurred in the devices or elements incorporated within the system, it is possible to prevent a danger such that the throttle valve is kept open, by outputting an alarm or by compulsorily close the throttle valve.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. An accelerator pedal control system for an automotive vehicle, which comprises:
   (a) an accelerator pedal;
   (b) a throttle valve;
   (c) means for detecting a stroke of said accelerator pedal and outputting an accelerator pedal stroke signal;
   (d) means for calculating a target throttle valve opening rate in response to the detected accelerator pedal stroke signal and generating a target throttle valve opening rate control command signal corresponding thereto;
   (e) means for driving said throttle valve in response to the target throttle valve opening rate control command signal;
   (f) means for detecting that said accelerator pedal is at its zero-stroke position and outputting an accelerator pedal zero-stroke signal;
   (g) means for detecting that said throttle valve is at its initial position and outputting a throttle valve initial-position signal; and
   (h) means for generting an abnormality command signal when the throttle-valve initial-position signal is not outputted within a predetermined time interval after the accelerator pedal zero-stroke signal has been outputted.

2. An accelerator pedal control system for an automotive vehicle, which comprises:
   (a) an accelerator pedal;
   (b) a throttle valve;
   (c) accelerator pedal zero-stroke switch for outputting a pedal zero-stroke signal when said accelerator pedal is at its zero-stroke position;
   (d) an accelerator pedal stroke potentiometer for outputting a pedal stroke signal indicative of the actual pedal stroke;
   (e) a throttle valve initial position switch for outputting a throttle initial position signal when said throttle valve is at its initial position;
   (f) a throttle valve potentiometer for outputting a throttle valve position signal indicative of the actual opening rate;
   (g) a microcomputer responsive to said accelerator pedal zero-stroke switch, said accelerator pedal stroke potentiometer, and said throttle valve initial position switch, said microcomputer determining a target throttle valve opening rate according to the detected pedal stroke signal in accordance with table look-up method and interpolation calculation and outputting a target throttle valve opening rate control command signal, said microcomputer further starting a timer function in response to the pedal zero-stroke signal and outputting an abnormality signal when the throttle initial position signal is not inputted thereto within a predetermined time interval after the pedal zero-stroke signal has been inputted thereto; and
   (h) a servomotor driver for driving said throttle valve to a target opening rate in response to the target control command signal outputted from said microcomputer and the throttle valve position signal outputted from said throttle valve potentiometer.

3. An accelerator pedal control system for an automotive vehicle, which comprises:
   (a) an accelerator pedal;
   (b) a throttle valve;
   (c) accelerator pedal zero-stroke switch for outputting a pedal zero-stroke signal when said accelerator pedal is at its zero-stroke position;
   (d) an accelerator pedal stroke potentiometer for outputting a pedal stroke signal indicative of the actual pedal stroke;
   (e) a throttle valve initial position switch for outputting a throttle initial position signal when said throttle valve is at its initial position;
   (f) a throttle valve potentiometer for outputting a throttle valve position signal indicative of the actual opening rate;
   (g) a microcomputer responsive to said accelerator pedal zero-stroke switch, said accelerator pedal stroke potentiometer, said throttle valve initial position switch, and said throttle valve potentiometer, said microcomputer determining a target throttle valve opening rate according to the detected pedal stroke signal in accordance with table look-up method and interpolation calculation and outputting a throttle valve opening rate difference control command signal between the determined target opening rate and the actual opening rate, said microcomputer further starting a timer function in response to the pedal zero-stroke signal and outputting an abnormality signal when the throttle initial position signal is not inputted thereto within a predetermined time interval after the pedal zero-stroke signal has been inputted thereto; and
   (h) an actuator for driving said throttle valve to a target opening rate in response to the difference control command signal outputted from said microcomputer.

* * * * *

UNITED STATES PATENT AND TRADEMARK OFFICE
CERTIFICATE OF CORRECTION

PATENT NO. : 4,519,360
DATED : May 28, 1985
INVENTOR(S) : Terukiyo MURAKAMI

It is certified that error appears in the above-identified patent and that said Letters Patent is hereby corrected as shown below:

IN THE BIBLIOGRAPHICAL DATA:

Kindly insert the priority data as follows:
-- Foreign Application Priority Data
Apr. 11, 1983  Japan   NO. 58-63283 --

Signed and Sealed this

Fifteenth Day of October 1985

[SEAL]

Attest:

Attesting Officer

DONALD J. QUIGG

Commissioner of Patents and
Trademarks—Designate